(12) United States Patent
Katoh et al.

(10) Patent No.: US 6,601,484 B1
(45) Date of Patent: Aug. 5, 2003

(54) METHOD AND TOOL FOR CUTTING INSIDE CORNER

(75) Inventors: Kouichi Katoh, Numazu (JP); Takamasa Ito, Shizuoka-ken (JP); Nobuyuki Endo, Mishima (JP); Makoto Sagara, Mishima (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/598,381

(22) Filed: Jun. 21, 2000

(30) Foreign Application Priority Data

Jun. 22, 1999  (JP) .......................................... P11-175933

(51) Int. Cl.[7] .............................. B23B 1/00; B23B 41/04
(52) U.S. Cl. ............................. 82/1.11; 82/1.3; 82/1.4; 82/118
(58) Field of Search .................... 82/1.11, 1.3, 1.4, 82/1.5, 11.3, 118, 133, 142; 407/53, 54, 55, 56, 57, 58, 113, 114, 115, 116

(56) References Cited

U.S. PATENT DOCUMENTS

| | | | | |
|---|---|---|---|---|
| 456,258 A | * | 7/1891 | Hutton et al. .................. 82/1.3 |
| 1,270,144 A | * | 6/1918 | Gallimore ...................... 82/1.3 |
| 2,411,209 A | * | 11/1946 | Hall et al. ................. 407/56 X |
| 2,529,157 A | * | 11/1950 | Higerd ......................... 407/34 |
| 2,661,640 A | * | 12/1953 | Ruegg ........................... 82/1.3 |
| 3,134,277 A | * | 5/1964 | Fritz ............................. 82/1.3 |
| 3,303,862 A | * | 2/1967 | Westenberger ............... 144/218 |
| 3,858,482 A | * | 1/1975 | Scaduto ...................... 409/232 |
| 4,461,602 A | * | 7/1984 | Zettl ............................ 407/40 |
| 4,651,599 A | * | 3/1987 | Ley ............................ 82/1.3 X |
| 5,076,744 A | * | 12/1991 | Kitagawa et al. ............. 409/66 |
| 5,188,488 A | * | 2/1993 | Nakayama et al. ........... 407/54 |
| 5,201,619 A | * | 4/1993 | Yodoshi ...................... 409/132 |
| 5,215,415 A | * | 6/1993 | Fukuoka et al. .............. 108/86 |
| 5,669,744 A | * | 9/1997 | Hines ......................... 409/181 |
| 5,713,253 A | * | 2/1998 | Date et al. .................... 82/1.11 |
| 6,227,082 B1 | * | 5/2001 | Hormansdorfer et al. .... 82/1.11 |
| 6,230,070 B1 | * | 5/2001 | Yodoshi ..................... 700/162 |
| 6,315,505 B1 | * | 11/2001 | Moore ........................ 408/199 |

FOREIGN PATENT DOCUMENTS

| EP | 0422586 A2 | * | 4/1991 | |
|---|---|---|---|---|
| JP | 54124381 A | * | 9/1979 | ............. B23C/5/20 |

\* cited by examiner

*Primary Examiner*—Henry W. H. Tsai
(74) *Attorney, Agent, or Firm*—Finnegan, Henderson, Farabow, Garrett & Dunner, L.L.P.

(57) ABSTRACT

A cutting tool for a machine tool is provided in order to cut an inside corner of a workpiece. The cutting tool has at least one cutting edge formed on its bottom. In operation, the cutting tool is rotated by the machine tool. Further, both cutting tool and workpiece move relatively to each other in accordance with the rotating angle of the cutting tool so that the cutting tool has its outer end describing a moving track in agreement with the contour of an inside corner of the workpiece. The cutting tool further moves along the direction of a rotating axis of the cutting tool in rotation.

15 Claims, 6 Drawing Sheets

W

W

W

METHOD AND TOOL FOR CUTTING INSIDE CORNER

BACKGROUND OF THE INVENTION

The present invention relates to a method of cutting an inside corner of a workpiece and a cutting tool for cutting the inside corner.

In order to cut the inside corner of the workpiece, for example, an inside corner of a workpiece pocket, such as a die hole in a mold, there is generally used a rotating cutting tool (e.g. columnar end mill) in the machining or a rod electrode, a wire electrode, etc. in the electrical discharge machining.

In cutting the pocket by the end mill, it is impossible to carry out the processing (processing of corner R) of an inside corner having a curvature radius smaller than a radius of the tool and therefore, the end mill is required to have a radius less than the minimum radius of curvature of the inside corner. Additionally, if the pocket is deep, then it requires a long tool having a small diameter, accompanying the possibility of inappropriate cutting because of insufficient rigidity of the tool itself. Further in the end milling, it is impossible to process an inside corner having an acute angle (e.g. 90 degrees) called "pin angle".

Therefore, when processing the inside corner so as to have a small radius of curvature and the pocket to be large in depth or processing the above pin corner, the electrical discharge machining has been generally allocated rather than the cutting using the cutting tool. However, the electrical discharge machining has a drawback of inefficient workability in comparison with the machining efficiency of cutting, causing the machining cost to be increased. Under such a situation, there is a great demand to make the electrical discharge machining unnecessary in view of shortening the machining lead time, whereby all the processing is completed by a single machine tool.

SUMMARY OF THE INVENTION

It is therefore an object of the present invention to provide an inside corner cutting method where the above-mentioned working (i.e. formation of an inside corner having a small curvature radius and a pocket having a large depth; formation of an inside corner having an acute angle, such as 90 degrees, called "pin angle") can be effectively completed by the cutting and further provide a cutting tool for embodying the inside corner cutting method.

In order to accomplish the above object, the present invention provides the inside corner cutting method characterized by the following features. First, a cutting tool used in the method has at least one cutting edge formed at its bottom part and is driven to rotate. The cutting tool and the workpiece to be processed move relatively to each other in accordance with the rotating angle of the cutting tool so that the cutting tool has its outer end describing a moving track in agreement with the contour of the inside corner of the workpiece as the object to be processed. Further, the cutting tool moves along the direction of a rotating axis of the rotating cutting tool. Note that, in this specification, the rotating axis of the cutting tool is identical to its longitudinal axis passing through a rotating center of the cutting tool.

According to the above method, repeatedly, the cutting tool having the cutting edge is used. The so-rotated cutting tool and the workpiece to be processed relatively move in a manner that an outer end of the cutting edge describes the moving track in agreement with the contour of the inside corner of the workpiece, while the cutting tool is also displaced along the direction of the rotating axis of the rotating cutting tool. Accordingly, while maintaining the rigidity of the tool sufficiently, the above-mentioned working (i.e. formation of an inside corner having a small curvature radius and a pocket having a large depth; formation of an inside corner having an acute angle, such as 90 degrees, called "pin angle") can be effectively completed by the only cutting.

The cutting tool and the workpiece may move relatively to each other in a plane crossing the rotating axis of the cutting tool. Further, the relative movement between the cutting tool and the workpiece is fixed and unchangeable throughout the whole movement of the cutting tool in the direction of the rotating axis.

In the above-mentioned method, it is executed to cut the inside corner under condition that the relative movement in the plane crossing the rotating axis is fixed and unchangeable throughout the whole movement of the cutting tool in the direction of the rotating axis. Thus, the R(round) processing and the "pin angle" processing can be accomplished against the inside corner succeeding to vertical faces (i.e. surfaces parallel to the rotating axis of the tool) by the only cutting, efficiently.

Alternatively, the relative movement between the cutting tool and the workpiece may change corresponding to the movement of the cutting tool in the direction of the rotating axis.

In this case, it is executed to cut the inside corner under condition that the relative movement in the plane crossing the rotating axis changes corresponding to the movement of the cutting tool in the direction of the rotating axis. Thus, the R(round) processing and the "pin angle" processing can be accomplished against the inside corner succeeding to inclined faces (i.e. surfaces inclined to the rotating axis of the tool) by the only cutting, efficiently.

In the above-mentioned method, there may be employed a cutting tool which includes a main body detachably attached to a main spindle of the machine tool so as to rotate about the rotating axis of the cutting tool in rotation and a cutting edge arranged on a straight line deviated from the rotating axis and also fixed on a bottom face of the main body. Owing to the adoption of the cutting tool, the above method.could be embodied efficiently.

Apropos of this cutting tool, the bottom face of the main body may be substantially configured in the form of a polygon in plan view. Further, the cutting edge may be arranged on one side of the polygon so as to extend from one peak of the polygon toward another peak thereof and the cutting edge may have a length generally equal to half of the one side of the polygon. The bottom face of the main body may be provided, behind the cutting edge in the rotating direction of the cutting tool, with a "run off" angle. Owing to the adoption of the cutting tool, the above method could be embodied more efficiently.

The above and other features and advantages of the present invention will be more apparent, and the invention itself will best be understood, from a study of the following description and appended claims, with reference to the attached drawings showing a preferred embodiment of the invention.

DESCRIPTION OF THE PREFERRED EMBODIMENT

Embodiments of the present invention will be described with reference to the drawings.

Figure 1:
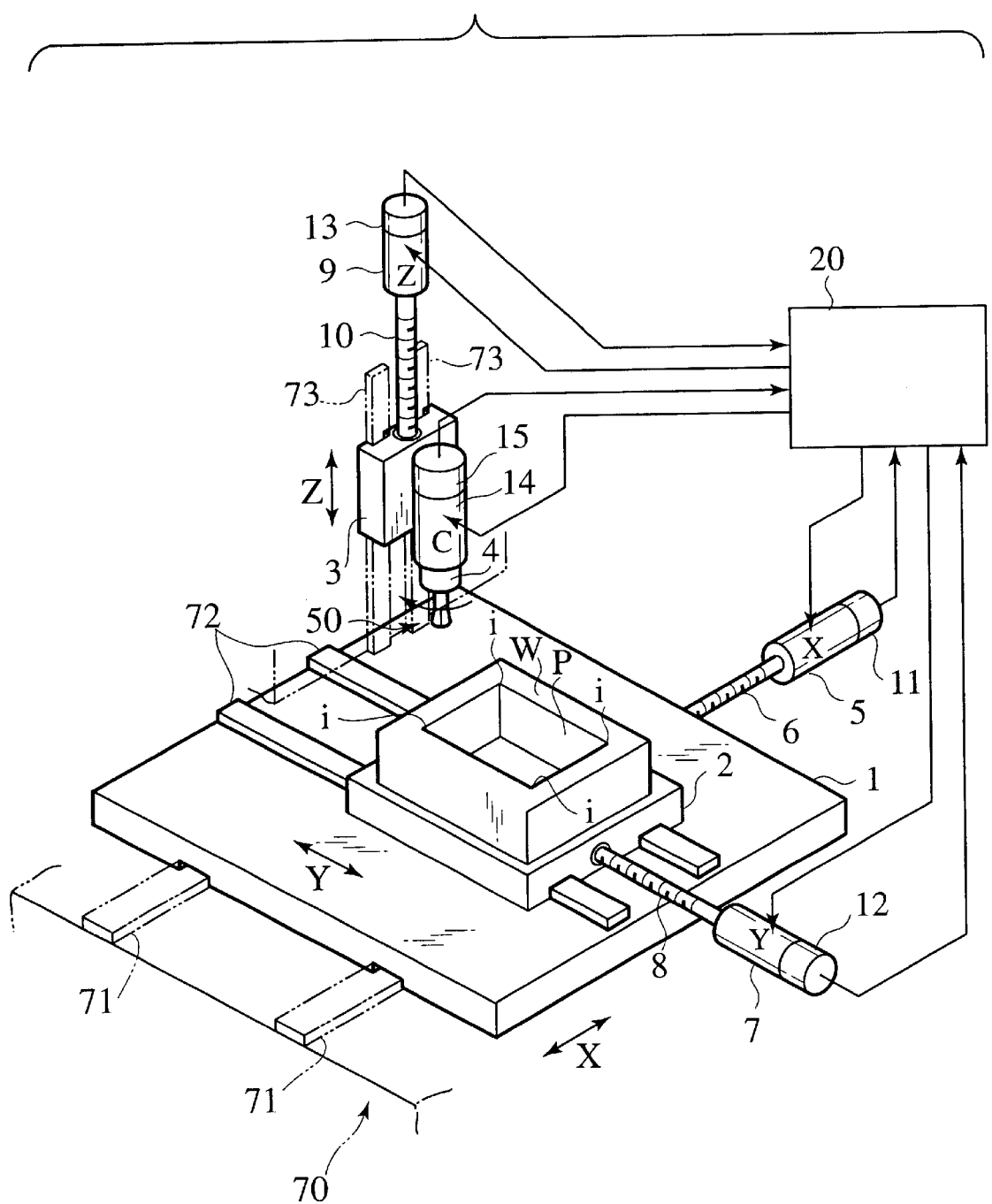
FIG. 1 is a perspective view showing one example of a machine tool embodying the inside corner cutting method of the present invention.

FIG. 1 illustrates a machine tool for embodying the inside corner cutting method of the invention. The machine tool has a base 70, an X-axis table 1, a Y-axis table 2, a spindle stock 3 and a main spindle 4. The X-axis table 1 is movably arranged on guide rails 71 on the base 70 in the direction of X-axis. The Y-axis table 2 is movably arranged on guide rails 72 on the X-axis table 1 in the direction of Y-axis. The spindle stock 3 is movably arranged on guide rails 73 on the base 70 in the direction of Z-axis. The main spindle 4 is attached to the spindle stock 3. A workpiece W to be machined is positioned on the Y-axis table 2.

The X-axis table 1 is moved to the X-axis direction through an X-axis feed mechanism 6 driven by an X-axis servomotor 5. The Y-axis table 2 is moved to the Y-axis direction through a Y-axis feed mechanism 8 driven by a Y-axis servomotor 7. The spindle stock 3 is moved to the Z-axis direction through a Z-axis feed mechanism 10 driven by a Z-axis servomotor 9. The respective servomotors 5, 7, 9 of X, Y, Z-axes are provided with rotary encoders 11, 12, 13, respectively.

The main spindle 4 is driven by a spindle motor 14. The spindle motor 14 has a rotary encoder 15 attached thereto, for detecting the rotating angle of the spindle 4. The main spindle 4 is equipped with a cutting tool 50.

The machine tool of the embodiment is identical to a numerical control type machine including a numerical control unit 20. The information about positions and rotating angles from the rotary encoders 11, 12, 13, 15 are respectively inputted into the numerical control unit 20. The unit 20 controls the rotation of the main spindle 4 by the spindle motor 14 and the operations of the servomotors 5, 7, 9 of the respective shafts, in accordance with a predetermined machining program.

Figure 2:
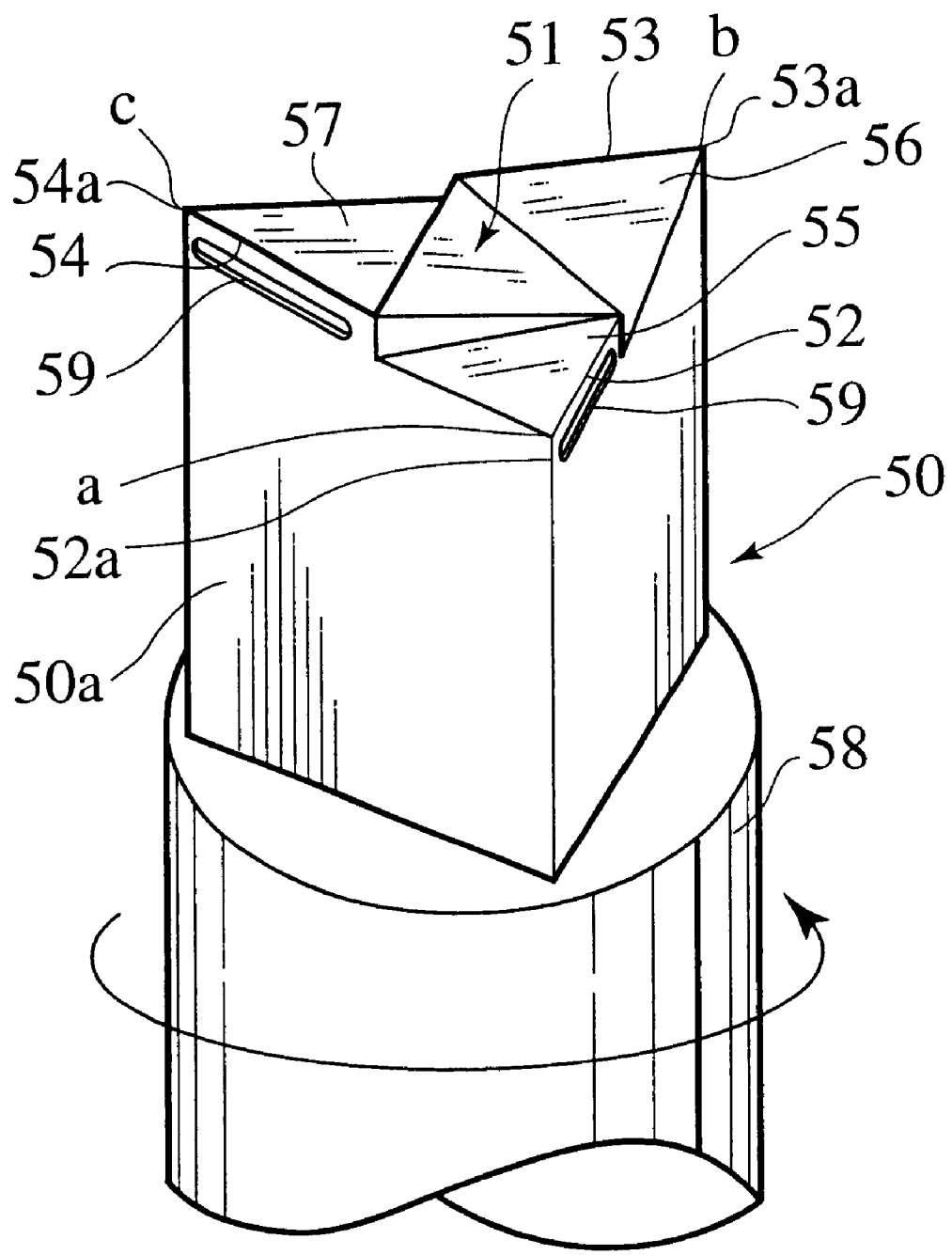
FIG. 2 is a perspective view of a cutting tool provided to embody the inside corner cutting method of the invention, showing the "upside-down" state of the cutting tool.
Figure 3:
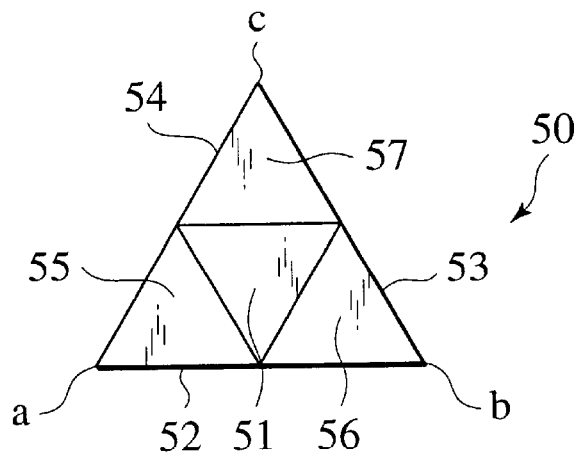
FIG. 3 is a bottom view of the cutting tool provided to embody the inside corner cutting method of the invention.

FIGS. 2 and 3 show a cutting tool used for executing the inside corner cutting method of the invention. Note that FIG. 2 shows the cutting tool which is turned upside down with its upside bottom face, while FIG. 3 is a bottom view of the cutting tool.

Basically, the cutting tool of the present invention is a rotary-type cutting tool which has a cutting edge on at least one side of a polygonal bottom (e.g. triangle, square, pentagon, etc.) or a periphery of the side of the polygonal bottom. In the shown embodiment, the cutting tool 50 includes a main body 50a having a bottom face 51 in the form of a regular triangle and three cutting edges 52, 53, 54 formed on respective sides of the bottom face 51 respectively. The cutting edges 52, 53, 54 are formed so as to extend ahead of respective peaks a, b, c in the rotating direction of the cutting tool 50 and have a length of substantial half of each side, respectively. Behind the respective cutting edges on the bottom face 51 in the rotating direction of the tool 50, there are formed respective angles of "run off" (i.e. flanks 55, 56, 57) each of which directs toward the other cutting edge. In this embodiment, the cutting edges 52, 53, 54 are formed on respective outer ridgelines 52a, 53a, 54a extending from the peaks a, b, c in the axial direction of the tool 50, respectively.

The cutting tool 50 includes a column-shaped trunk 58 which passes through the inner center of the regular triangle-shaped bottom face 51 and extends along the axial direction of the tool 50. Being grasped by a not-shown chuck of the main spindle 4, the trunk 58 is also rotated about the axis of the tool 50 in the counter-clockwise direction of FIGS. 2 and 3. Note that breaker grooves 59 are formed in the vicinity (front side) of the cutting edges 52, 53, 54 in order to break cutting chips. The breaker grooves 59 operates to alter the discharged cutting chips so as to direct the workpiece W thereby curling the cutting chips along the grooves 59. Consequently, the cutting chips are broken by their contact with the workpiece W. Moreover, the provision of the breaker grooves 59 contributes the formation of acute noses of the cutting edges 52, 53, 54. Thus, owing to the provision of the cutting edges with acute noses, the cutting resistance can be reduced thereby to improve the workability. Therefore, the cutting tool 50 having the breaker grooves 59 is suitable in the present cutting method to change the width of cut. Note that the breaker grooves 59 have only to be provided in accordance with the material of the workpiece W.

When it is required to form an inside corner (i) in a pocket P of the workpiece W by cutting, it is first executed to rotate the cutting tool 50 by the main spindle 4.

Next, move the workpiece W in regard to the cutting tool 50 in a plane parallel to the polygonal bottom face 51 so that the respective peaks a, b, c of the bottom face 51 containing the sides constituting the cutting edges 52, 53, 54 describe the moving track in agreement with a profile of the inside corner (i) of the workpiece W in sequence. Owing to the application of feed-back control to both operations of the X-axis servomotor 5 and the Y-axis servomotor 7 corresponding to the rotating angle of the cutting tool 50 detected by the rotary encoder 15, the movement of the workpiece W is accomplished by mutually driving the X-axis table 1 and the Y-axis table 2 in synchronism. After completing the machining in one plane, move the cutting tool 50 along the tool's center axis (alias rotating axis) by the Z-axis servomotor 9 (feeding in Z-axis) and relatively move the workpiece W in another plane deeper than the above one plane. By repeating such the processes, the depth of cut can be provided for the workpiece W, so that the inside corner (i) is cut to have a designated profile. In the shown embodiment, three cuttings a rotation of the tool 50 are performed by the cutting edges 52, 53, 54.

Figure 6:
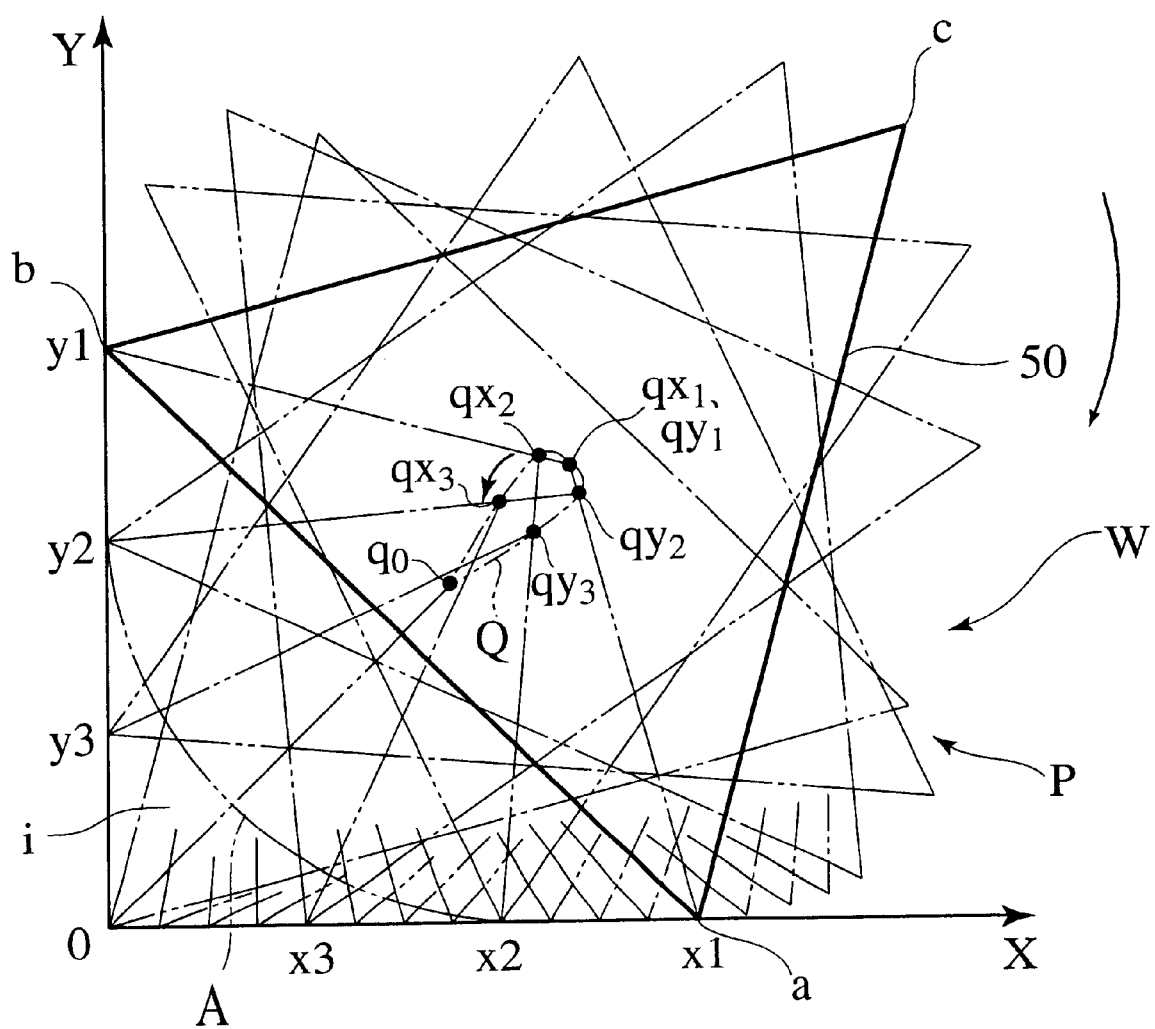
FIG. 6 is an explanatory diagram showing a sequential moving track of the cutting tool in case of the pin angle processing of 90 degrees.

With reference to FIG. 6, we now describe the situation of cutting an acute corner of 90 degrees at the inside corner (i) of the pocket P in the workpiece W, in detail. FIG. 6 illustrates the moving track of the cutting tool 50 in relation to the workpiece W.

First, the workpiece W for application of the inside corner processing has the pocket P previously formed by end milling or the like. At the inside corner (i) of the pocket P, there exists a corner area which is surrounded by an imaginary arc line A, X-axis and Y-axis and also to be eliminated by the inside corner processing.

With the rotation of the cutting tool 50 shown by plural regular triangles, the peak (a) moves on respective points $x_1$, $x_2$ and $x_3$ on the X-axis in order and subsequently reaches a point (o) (i.e. intersecting point of both X-axis and Y-axis). Thereafter, the peak (a) moves on respective points $y_3$, $y_2$ and $y_1$ on the Y-axis, in order. Such a motion of the peak (a) is accomplished since the center (i.e. rotating axis) of the rotating tool 50 is displaced against the workpiece W relatively. When the peak (a) reaches the point ($y_1$), then the peak (c) behind the peak (a) in the rotating direction does reach the point $x_1$ thereby completing one third of one revolution of the tool 50.

The moving tract of the rotating axis is shown with an alphabet Q in FIG. 6. When the peak (a) moves on the points $x_1$, $x_2$, $x_3$, o, $y_3$, $y_2$ and $y_1$ in sequence, the rotating axis of the tool 50 moves on points $qx_1$, $qx_2$, $qx_3$, qo, $qy_3$, $qy_2$ in order and finally reaches a point $qy_1$. The point $qy_1$ agrees with the points $qx_1$. The rotating axis makes one circuit of track Q with every one third revolution of the tool 50.

In this way, every one third revolution of the tool 50 allows the corner area to be cut off by a designated depth. After completing one third revolution of the tool 50, then it is displaced along the rotating axis by a predetermined length, so that the tool 50 makes one third revolution in a new plane deeper than the previous plane by one step. By repeating a series of operations mentioned above, the processing of inside corner of a designated depth can be applied on the workpiece W.

That is, since the cutting process of the embodiment can be accomplished by a thick tool released from the limitation of radius (R) of the inside corner, there is no possibility that the cutting tool 50 exhibits an insufficient rigidity in processing a deep pocket.

Figure 4:
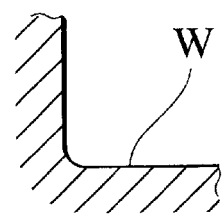
FIG. 4 is a plan view showing one example of cutting a round corner (R) in accordance with the inside corner cutting method of the invention.
Figure 5:
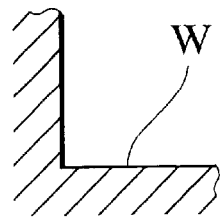
FIG. 5 is a plan view showing one example of cutting a pin-angled corner in accordance with the inside corner cutting method of the invention.

According to the above-mentioned cutting method, with no limitation of the diameter of the cutting tool 50, a corner of a small curvature radius R as shown in FIG. 4 can be cut while using the cutting tool having a radius larger than the above radius R of the corner and furthermore, it is possible to process a corner having a pin angle larger than the inside angle of the polygonal bottom face 51. That is, since the inside angle is equal to 60 degrees in the cutting tool 50 having a bottom face in the form of a regular triangle, it is possible to provide the corner having a pin angle of 90 degrees as shown in FIG. 5 by cutting.

Figure 7A:
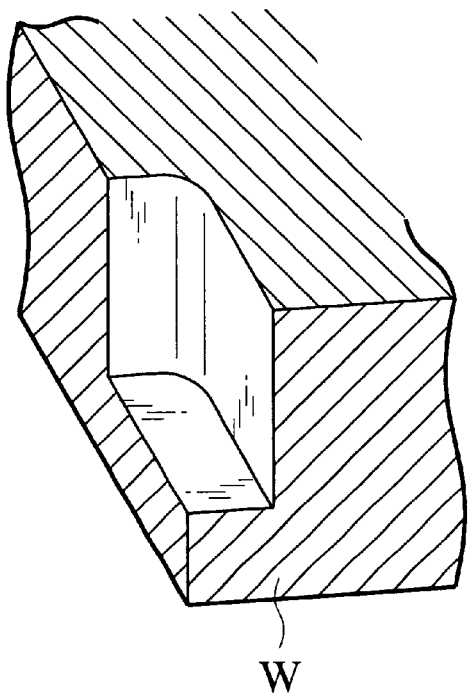
FIG. 7A is a perspective view showing one example of applying the round corner on the inside corner having vertical faces by cutting.
Figure 7B:
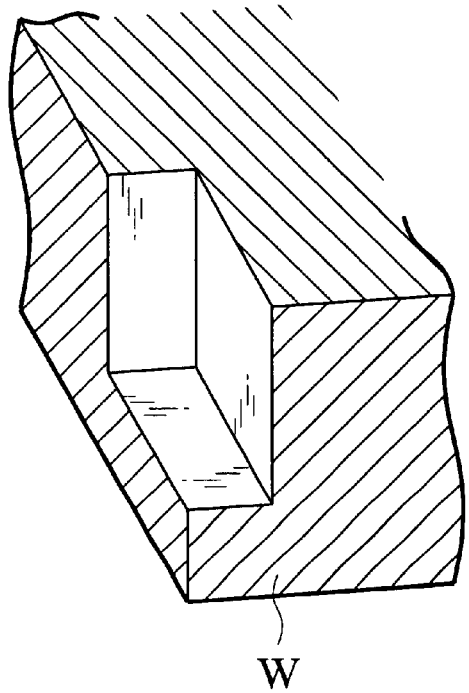
FIG. 7B is a perspective view showing one example of applying the pin-angle on the inside corner having vertical faces by cutting.

In the above-mentioned cutting process, when it is established that the track in relative movement between the cutting tool 50 and the workpiece W in parallel with the tool bottom is constant through the span of cutting movement, it is possible to apply the above-mentioned roundish processing and the angular processing on the inside corners succeeding to respective vertical faces as shown in FIGS. 7A and 7B.

Figure 8:
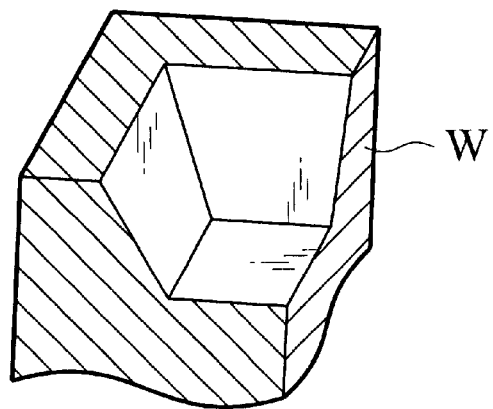
FIG. 8 is a perspective view showing one example of cutting the inside corner having slanted faces.

Additionally in the above cutting process, when it is established that the track in relative movement between the cutting tool 50 and the workpiece W in parallel with the tool bottom changes corresponding to the cutting movement, it is possible to carry out the processing against the inside corner succeeding to respective inclined faces as shown in FIG. 8.

As to the workpiece's movement in the directions of both X-axis and Y-axis, it should be carried out under the synchronous biaxial control. While, regarding the workpiece's movement in the direction of Z-axis (feed in the direction of depth), there is an option to control the movement at the same time of respective movements of both X-axis and Y-axis (i.e. synchronous control) or carry out the movements of both X-axis and Y-axis upon the single establishment of a depth of cutting in the direction of Z-axis (i.e. non-synchronous control).

Figure 9:
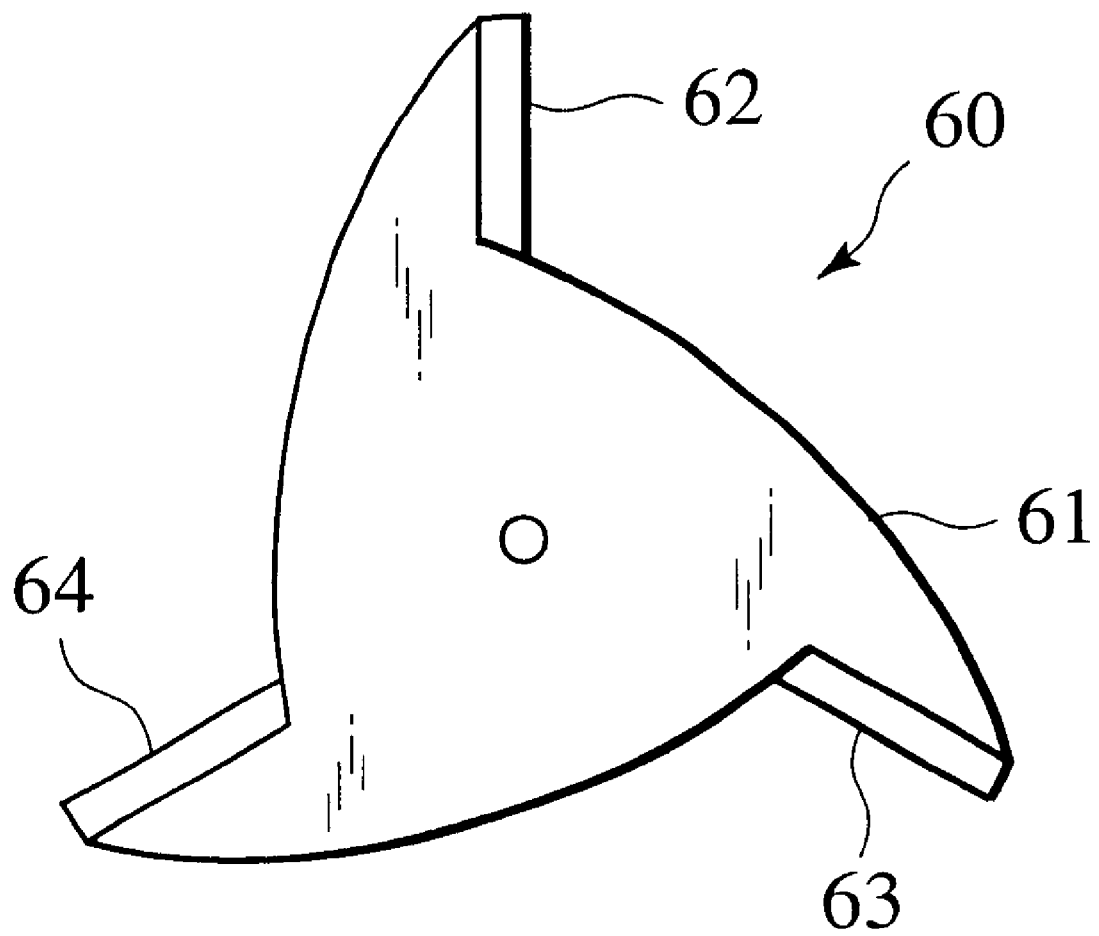
FIG. 9 is a bottom view showing another machine tool provided to embody the inside corner cutting method of the present invention.

Additionally, the cutting tool used in the cutting method of the invention is not limited to the shown cutting tool 50 having the above-mentioned polygonal bottom face. For example, as shown in FIG. 9, it is also possible to adopt a three-leafed and throw-away cutting tool 60 of having a tool body 61 provided with detachable tips 62, 63, 64 constituting the above cutting edges. Alternatively, it may be replaced with another throw-away tool having a two-leafed or four-leafed contour.

Finally, it will be understood by those skilled in the art that the foregoing description are some embodiments of the disclosed cutting method and tool, and that various changes and' modifications may be made to the present invention without departing from the spirit and scope thereof.

What is claimed is:

1. A method of cutting an inside corner of a workpiece, comprising:

providing a main spindle having a rotating axis;

attaching a cutting tool to the main spindle for rotation of the cutting tool about the rotating axis, the cutting tool having a regular polygonal bottom face with respective peaks and sides, at least one of the sides comprising a cutting edge in the rotating direction, the cutting edge extending from a peak;

rotating the cutting tool about the rotating axis while effecting relative movement between the cutting tool and the workpiece, the relative movement forming a cyclic moving track of the rotating axis of the cutting tool in accordance with the rotating angle of the cutting tool, so that the peak from which the cutting edge extends moves in a path corresponding to a profile of the inside corner of the workpiece; and displacing the cutting tool axially along the rotating axis of the cutting tool.

2. A method of cutting as claimed in claim 1, wherein each of the sides of the polygonal bottom face comprises the cutting edge.

3. A method of cutting as claimed in claim 2, wherein:

the polygonal bottom face comprises N number of peaks and N number of sides;

the relative movement between the cutting tool and the workpiece is in a plane parallel to the polygonal bottom face;

each cycle of the moving track cuts the inside corner of the workpiece in the plane; and 1/N revolution of the cutting tool completes a cycle of the cyclic moving track so that each of the cutting edges completes the cycle of the cyclic moving track.

4. A method of cutting as claimed in claim 3, comprising:

displacing the cutting tool axially along the rotating axis of the cutting tool for every 1/N revolution of the cutting tool for a predetermined length.

5. A method of cutting as claimed in claim 1, wherein the movement of the workpiece is performed by mutually driving an X-axis table and a Y-axis table in synchronism.

6. A method of cutting as claimed in claim 1, comprising providing a breaker groove in the vicinity of the cutting edge.

7. A method of cutting as claimed in claim 1, wherein:

the relative movement between the cutting tool and the workpiece is in a plane parallel to the polygonal bottom face; and the relative movement is fixed throughout the axial movement of the cutting tool along the rotating axis of the cutting tool.

8. A method of cutting as claimed in claim 1, wherein:

the relative movement between the cutting tool and the workpiece is in a plane parallel to the polygonal bottom face; and the relative movement changes corresponding to the axial movement of the cutting tool along the rotating axis of the cutting tool.

9. A cutting tool for cutting inside corner of a workpiece, comprising:

a main spindle having a rotating axis;

a main body detachably coupled to the main spindle so as to rotate about the rotating axis of the main spindle, the main body having a regular polygonal bottom face with at least one cutting edge arranged on a straight line deviated from the rotating axis;

a table for receiving the workpiece, the main spindle and the table being configured to move both axially and laterally with respect to each other; and a controller for controlling the rotation of the main spindle and the axial and lateral movement of the table, so that a peak of the polygonal bottom face of the main body moves in a path corresponding to a profile of the inside corner of the workpiece.

10. A cutting tool as claimed in claim 9, wherein:

the cutting edge is arranged on at least one side of the polygonal bottom face in the rotating direction.

11. A cutting tool as claimed in claim 10, wherein:

the cutting edge extends from a peak of the polygonal bottom face to a first half of the one side; and a second half of the one side forms an inclined edge with a predetermined run-off angle so as to form a run-off surface on the bottom face.

12. A cutting tool as claimed in claim 11, wherein the polygonal bottom face comprises N number of peaks and N number of:sides, each of the sides comprising the cutting edge.

13. A cutting tool as claimed in claim 9, comprising a breaker groove in the vicinity of the cutting edge.

14. A cutting tool as claimed in claim 9, wherein the regular polygonal bottom face comprises N number of peaks and N number of sides, wherein N is less than or equal to 4.

15. A cutting tool as claimed in claim 9, further comprising a detector for detecting the rotating angle of the main spindle, the detected rotating angle being inputted to the controller.

* * * * *